(12) United States Patent
Tang et al.

(10) Patent No.: US 8,201,784 B2
(45) Date of Patent: Jun. 19, 2012

(54) DISPLAY DEVICE WITH HEIGHT-ADJUSTMENT ASSEMBLY HAVING SPRING MEMBER

(75) Inventors: Zheng-Yong Tang, Shenzhen (CN); Chih-Huang Lien, Miao-Li (TW); Chun Xiang, Shenzhen (CN)

(73) Assignees: Innocom Technology (Shenzhen) Co., Ltd., Guangdong Province (CN); Chimei Innolux Corporation, Miaoli County (TW)

( * ) Notice: Subject to any disclaimer, the term of this patent is extended or adjusted under 35 U.S.C. 154(b) by 568 days.

(21) Appl. No.: 12/215,584

(22) Filed: Jun. 27, 2008

(65) Prior Publication Data

US 2009/0001241 A1 Jan. 1, 2009

(30) Foreign Application Priority Data

Jun. 29, 2007 (CN) .......................... 2007 1 0076258

(51) Int. Cl.
*F16M 11/00* (2006.01)
(52) U.S. Cl. ..................... 248/162.1; 248/127; 248/917; 361/679.05; 361/379.21
(58) Field of Classification Search .................. 248/157, 248/188.2, 274.1, 295.11, 327, 917, 919, 248/920, 924, 132, 161, 404, 125.1, 125.2, 248/125.8, 414, 188.5, 162.1, 406.2, 146, 248/159, 149, 127, 622, 297.11, 176.3; 361/679.05, 361/679.21, 679.22; 403/109.1, 109.5
See application file for complete search history.

(56) References Cited

U.S. PATENT DOCUMENTS

| 3,674,294 | A | * | 7/1972 | Kirkham ....................... 403/104 |
| 3,905,311 | A | * | 9/1975 | Carpentier ..................... 108/136 |
| 4,797,798 | A | * | 1/1989 | Schumaker et al. .......... 362/413 |
| 6,312,270 | B1 | | 11/2001 | Hamon |
| 6,708,940 | B2 | * | 3/2004 | Ligertwood .................. 248/324 |
| 6,712,321 | B1 | * | 3/2004 | Su et al. .................... 248/123.11 |
| 6,796,537 | B1 | * | 9/2004 | Lin ............................. 248/162.1 |
| 6,874,743 | B2 | * | 4/2005 | Watanabe et al. ........... 248/276.1 |
| 6,918,564 | B2 | * | 7/2005 | Yen et al. ........................ 248/404 |
| 6,966,532 | B2 | * | 11/2005 | Ishizaki et al. ............. 248/274.1 |
| 6,997,422 | B2 | * | 2/2006 | Sweere et al. ............ 248/123.11 |
| 7,036,787 | B1 | * | 5/2006 | Lin ............................... 248/676 |
| 2002/0088910 | A1 | * | 7/2002 | Sweere et al. ............. 248/286.1 |
| 2004/0004165 | A1 | | 1/2004 | Hong et al. |
| 2004/0056161 | A1 | * | 3/2004 | Ishizaki et al. ............. 248/176.3 |
| 2007/0195495 | A1 | * | 8/2007 | Kim et al. ..................... 361/681 |
| 2007/0262210 | A1 | * | 11/2007 | Oh et al. .................... 248/125.1 |

FOREIGN PATENT DOCUMENTS

| CN | 1467753 A | | 1/2004 |
| CN | 200420104987.3 Y | | 1/2006 |
| KR | 031520391 | * | 6/2006 |
| KR | 054781351 | * | 10/2006 |

* cited by examiner

*Primary Examiner* — Kimberly Wood
(74) *Attorney, Agent, or Firm* — Muncy, Geissler, Olds & Lowe, PLLC

(57) ABSTRACT

An exemplary display device includes a display panel and a height-adjustment assembly. The height-adjustment assembly includes a rail unit defining a rail, a sliding unit, and a spring member. The sliding unit is configured to slide along the rail. The display panel is fixed to the sliding unit. The spring member is fixed to the rail unit, and is configured to provide an elastic force applied to the sliding unit to the sliding unit when the sliding unit slides along the rail.

16 Claims, 4 Drawing Sheets

DISPLAY DEVICE WITH HEIGHT-ADJUSTMENT ASSEMBLY HAVING SPRING MEMBER

CROSS-REFERENCE TO RELATED APPLICATION

This application is related to, and claims the benefit of, a foreign priority application filed in China as Serial No. 200710076258.X on Jun. 29, 2007. The related application is incorporated herein by reference.

FIELD OF THE INVENTION

The present invention relates to a display device that includes a height-adjustment assembly having a spring member.

GENERAL BACKGROUND

Referring to FIG. 4, a typical display device 4 includes a display panel 42, a column 44, and a base 46. The column 44 is integrally formed with the base 46 and connected with the display panel 42 by a pivot axis 48. The display panel 42 and the column 44 are supported by the base 46, and can be rotated around the pivot axis 48.

It is widely held that a healthy position for a user to view a screen of the display panel 42 is such that a horizontal centerline of the display panel 42 is slightly below a horizontal line of sight of the user. However, the display device 4 is not configured to be readily adjustable to this desired position. It can be troublesome and time-consuming to precisely achieve a favorable working height for the display panel 42 of the display device 4.

What is needed, therefore, is a display device that can overcome the described limitations.

SUMMARY

In an exemplary embodiment, a display device includes a display panel and a height-adjustment assembly. The height-adjustment assembly includes a rail unit including a rail, a sliding unit, and a spring member. The sliding unit is configured (i.e., structured and arranged) to slide along the rail. The display panel is fixed to the sliding unit. The spring member is fixed to the rail unit, and is configured to apply an elastic force on when the sliding unit slides along the rail.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
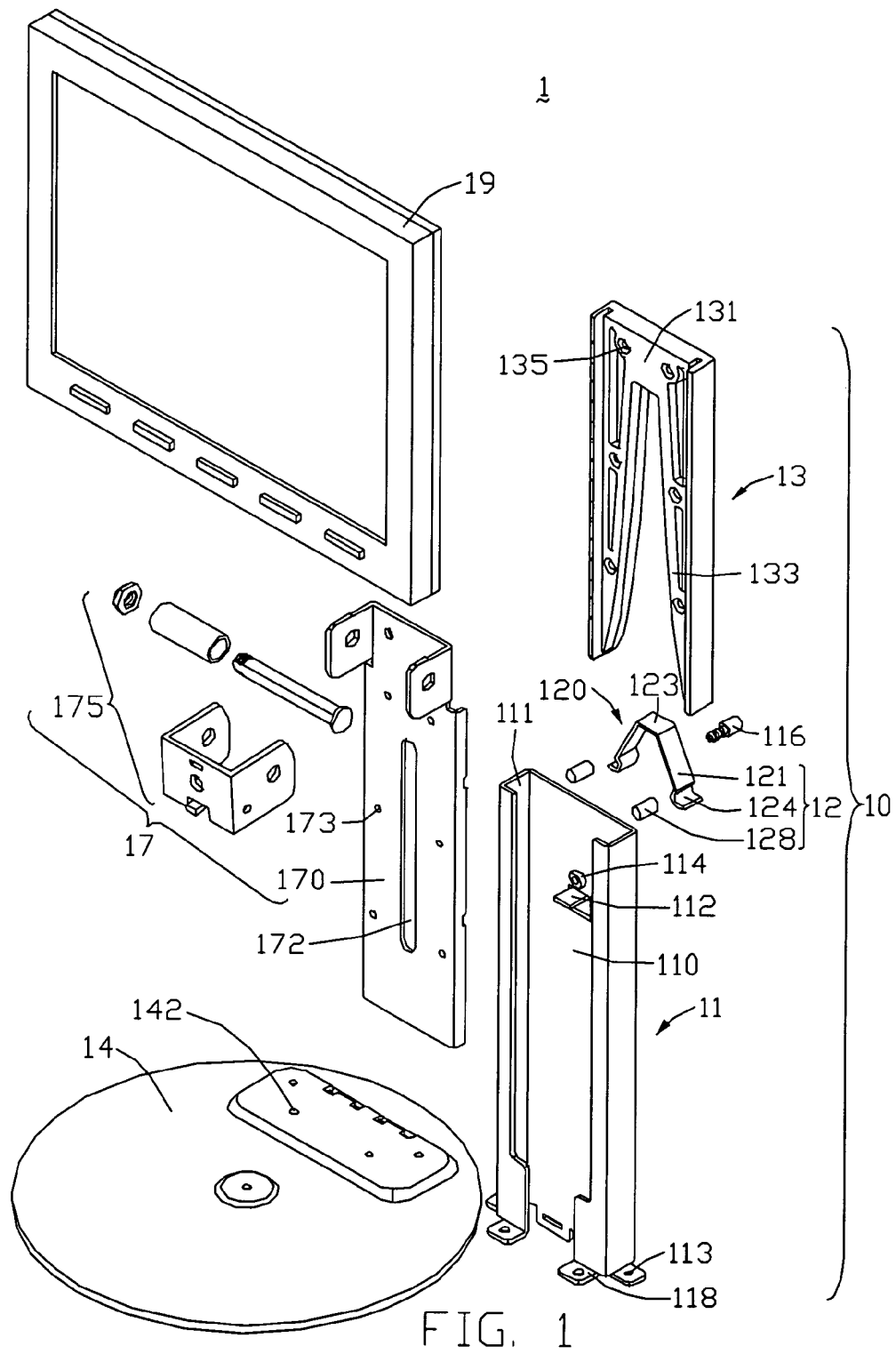
FIG. 1 is an exploded, isometric view of a display device according to an exemplary embodiment of the present invention, the display device including a height-adjustment assembly.

Referring to FIG. 1, a display device 1 according to an exemplary embodiment of the present invention is shown. The display device 1 includes a height-adjustment assembly 10, a locking apparatus 17, and a display panel 19. The display panel 19 is fixed to the height-adjustment assembly 10 by the locking apparatus 17, and a relative height of the display panel 19 can be adjusted by the height-adjustment assembly 10 (see below).

The height-adjustment assembly 10 includes a rail apparatus 11, a spring apparatus 12, a sliding apparatus 13, and a supporting base 14.

The rail apparatus 11 includes a main shell 110, a supporting plate 112, a through hole 114, a stopping screw 116, and four fixing feet 118. The main shell 110 includes two sliding slots 111 defined in two opposite vertical sides (i.e. side walls 125) thereof, respectively. In the illustrated embodiment, the sliding slots 111 each have a substantially U-shaped profile, and are parallel to each other. The supporting plate 112 and the through hole 114 are located between the sliding slots 111, and are adjacent to a top portion (not labeled) of the main shell 110. The through hole 114 is defined above the supporting plate 112, and corresponds to the stopping screw 116. The fixing feet 118 are respectively located at the bottommost extremities (not labeled) of the main shell 110, and each includes a first fixing hole 113 defined therein.

The spring apparatus 12 includes a spring body 120 and two rollers 128. The spring body 120 includes two side plates 121, and a top plate 123 interconnecting the side plates 121. The side plates 121 extend obliquely away from opposite sides of the top plate 123 in downward directions, and each include a receiving groove 124 defined at an end thereof. The receiving groove 124 has a substantially semicircular profile, and is configured for partly receiving the roller 128.

The sliding apparatus 13 includes a top arm 131, two side arms 133, and a plurality of second fixing holes 135. The top arm 131 interconnects top portions (not labeled) of the side arms 133 and defines an opening (not labeled) between the two side arms 133. The opening has a substantially inverted V profile. Each side arm 133 includes a first outer side (not labeled) and a second inner side (not labeled). The second inner side is disposed on a side of the side arm 133 adjacent the opening, and the first outer side is disposed on a side of the side arm 133 away from the opening. The two first outer sides of the two side arms 133 are parallel to each other, and a distance between the two second inner sides of the side arms 133 increases in a direction away from the top arm 131. That is, a distance between the side arms 133 increases in a direction away from the top arm 131. The second fixing holes 135 are defined in the top arm 131 and the side arms 133 in a predetermined pattern.

The supporting base 14 is substantially disc-shaped, and includes a plurality of third fixing holes 142 defined therein, which third fixing holes 142 respectively correspond to the first fixing holes 113 of the fixing feet 118.

The locking apparatus 17 includes a fixing plate 170 and a fixing assembly 175. The fixing plate 170 includes two fixing ears (not labeled), a groove 172, and a plurality of fourth fixing holes 173. The fixing ears perpendicularly extend from a top portion (not labeled) of the fixing plate 170, and are at the same side of the fixing plate 170. The groove 172 is defined in a central portion of the fixing plate 170, and is closed on both ends thereof. The fourth fixing holes 173 respectively correspond to the second fixing holes 135 of the sliding apparatus 13. The fixing assembly 175 is configured to fix a back side (not shown) of the display panel 19 to the fixing plate 170.

Figure 2:
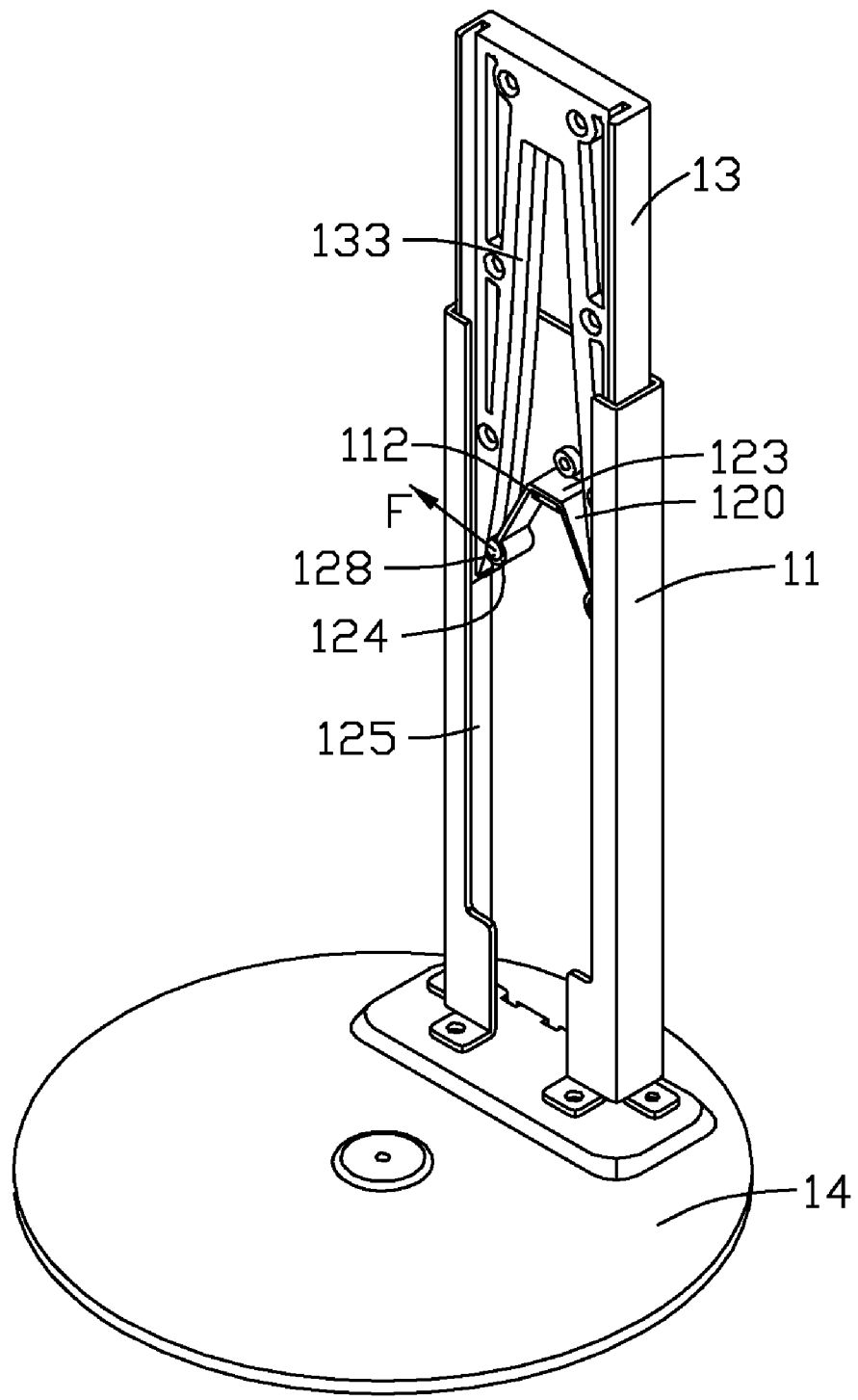
FIG. 2 is an isometric, assembled view of the height-adjustment assembly of FIG. 1.

Referring also to FIG. 2, the fixing feet 118 of the rail apparatus 11 are fixed to the supporting base 14, whereby a plurality of fixing bolts (not shown) are respectively engaged in the first fixing holes 113 of the fixing feet 118 and the third fixing holes 142 of the supporting base 14. The spring body 120 is fixed to the main shell 110 by the supporting plate 112 and the stopping screw 116, the top plate 123 of the spring body 120 is supported by the supporting plate 112, and the stopping screw 116 extends through the through hole 114 and presses the spring body 120 such that the spring body 120 is fixed to main shell 110 by the supporting plate 112 and the stopping screw 116. The rollers 128 are fittingly received in the receiving grooves 124. The side arms 133 of the sliding apparatus 13 are received in the sliding slots 111, the first outer sides of the side arms 133 abut the inner surfaces of the two opposite vertical sides (i.e., side walls 125) defining the two sliding slots 111 of the main shell 110 and can slide along the two sliding slots 111 of the main shell 110, and the rollers 128 respectively abut the second inner sides of the side arms 133 such that the side arms 133 elastically abut the rollers 128 and the two opposite vertical sides defining the two sliding slots 111 of the main shell 110, respectively, and the spring body 120 elastically urges the side arms 133 and is elastically clamped between the side arms 133. That is, the spring body 120 applies elastic force on the side arms 133 of the sliding apparatus 13 via the rollers 128. See for example force F in FIG. 2. Thus, the spring body 120 is deformed (compressed) between the side arms 133 and produces an elastic force because of an overall gravity of the sliding apparatus 13, the locking apparatus 17, and the display panel 19.

Figure 3:
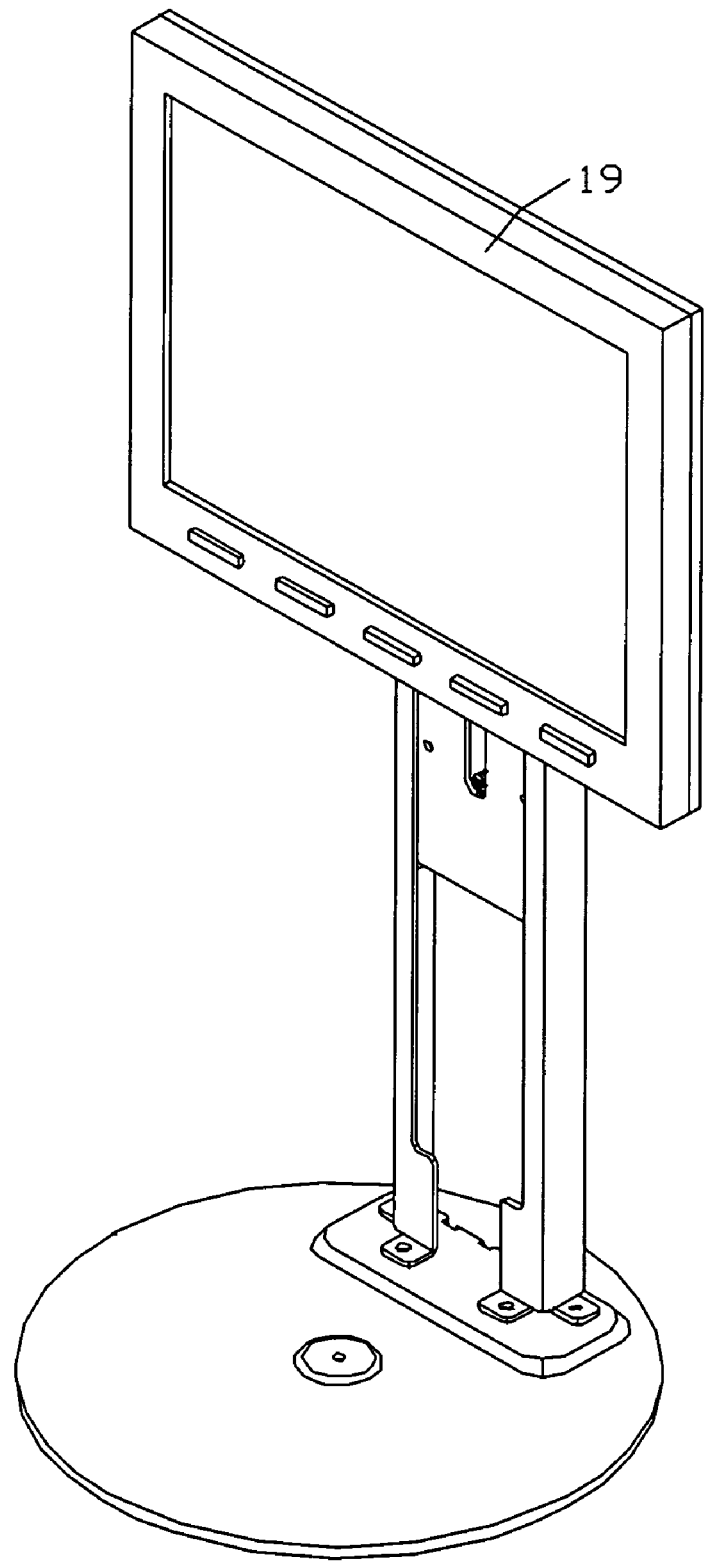
FIG. 3 is an isometric, assembled view of the display device of FIG. 1.
Figure 4:
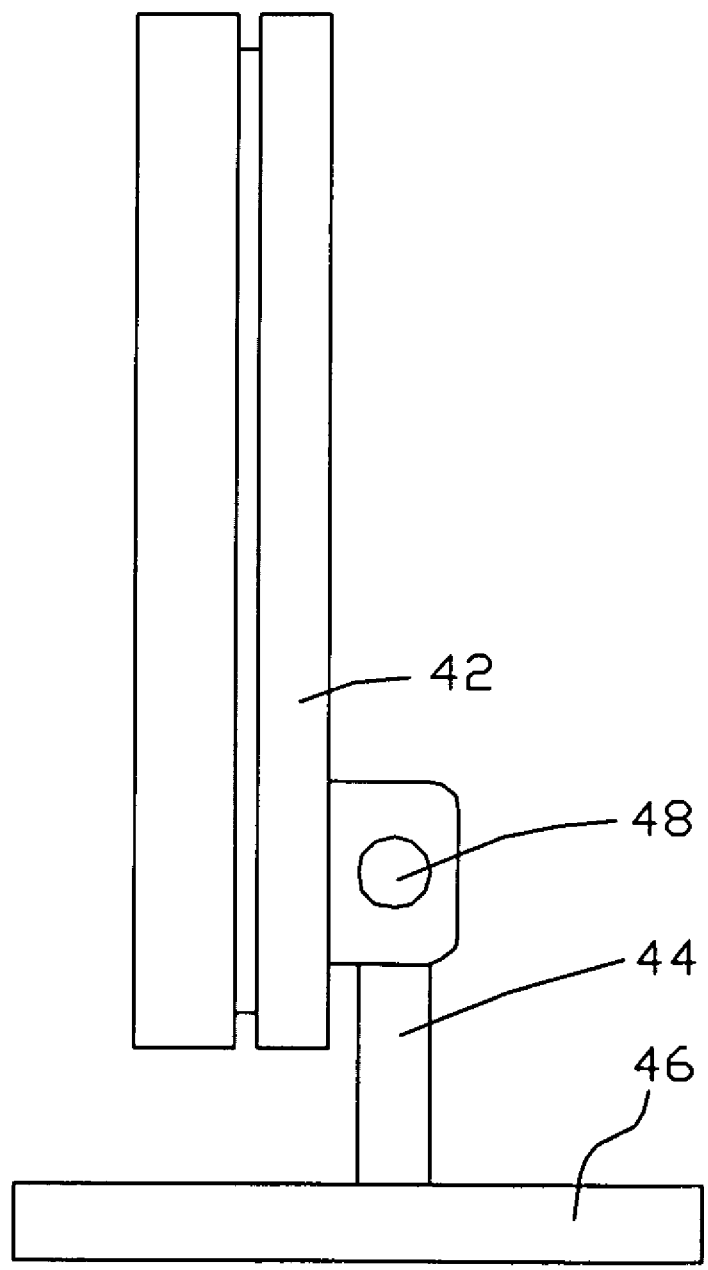
FIG. 4 is a side plan view of a conventional display device.

Referring also to FIG. 3, the back side of the display panel 19 is fixed to the fixing plate 170 of the locking apparatus 17 by the fixing assembly 175. The fixing plate 170 is further fixed to the sliding apparatus 13, whereby a plurality of bolts (not shown) extending through the second fixing holes 135 of the sliding apparatus 13 and the fourth fixing holes 173 of the fixing plate 170. The stopping screw 116 extends through the through hole 114, and is received in the groove 172 of the fixing plate 170.

A height of the display panel 19 relative to the supporting base 14 representing a horizontal central line of the display panel 19 can be adjusted as described below.

When the display panel 19 is located at a furthest position from the supporting base 14, a distance between the two contact points where the rollers 128 abut the side arms 133 is the farthest, and the elastic force produced by the spring body 120 is at a minimum. The elastic force can be divided into a vertical component of force and a horizontal component of force. The vertical component of force directs upwardly, and is less than gravity. Therefore, the display panel 19 tends to move toward the supporting base 14. However, the horizontal component of force presses the vertical side defining one of the sliding slots 111 of the main shell 110, which results in a maximum static friction force having a direction opposite to a direction of the moving tendency of the display panel 19. That is, the direction of the maximum static friction force is the same as the direction of the vertical component of force. In the illustrated embodiment, a combination of the vertical component of force and gravity is less than or equal to the maximum static friction force. Therefore, the display panel 19 can remain at the furthest position.

To adjust the height of the display panel 19 relative to the supporting base 14, an external force is applied to the display panel 19 to make the display panel 19 move toward the supporting base 14, and the side arms 128 move toward the supporting base 14. Because the spring body 120 is fixed to the main shell 110, the distance between the two contact points where the rollers 128 abut the side arms 133 decreases, and the deformation (compression) of the spring body 120 increases, such that the elastic force of the spring body 120 correspondingly increases. That is, the vertical component of force and the horizontal component of force increase with the movement of the display panel 19 toward the supporting base 14. When the display panel 19 moves to a desired position, the external force is released. If the vertical component of force is still less than gravity, the display panel 19 tends to move toward the supporting base 14, and the maximum static friction force subsists and exceeds its previous amount because of the increase of the horizontal component of force. In such a case, the display panel 19 can remain in the desired position. If the vertical component of force is equal to gravity, the display panel 19 has no tendency of moving toward or moving away from the supporting base 14. In such a case, the static friction force is zero, and the display panel 19 can remain at the desired position. If the vertical component of force exceeds gravity, the display panel 19 moves away from the supporting base 14, and the direction of the maximum static friction force is reversed. In the illustrated embodiment, the combination of the vertical component of force and gravity is less than the maximum static friction force, such that the display panel 19 can remain in the desired position.

When the display panel 19 is located at a position nearest to the supporting base 14, the elastic force produced by the spring body 120 is maximized. In the illustrated embodiment, the vertical component of force exceeds gravity, such that the display panel 19 tends to move away from the supporting base 14. Thus, the maximum static friction force is exerted opposite to the vertical component of force. However, the maximum static friction force exceeds the combined vertical component of force and gravity. Accordingly, the display panel 19 can remain in the nearest position.

In detail, when the display panel 19 moves to the furthest position from the supporting base 14, the stopping screw 116 received in the groove 172 of the fixing plate 170 prevents the display panel 19 from further motion away from the supporting base 14. Similarly, when the display panel 19 moves to the position nearest to the supporting base 14, the stopping screw 116 blocks the display panel 19 from moving further toward the supporting base 14, such that movement of the display panel 19 is limited within a predetermined range.

In summary, the height of the display panel 19 relative to the supporting base 14 can be conveniently and reliably adjusted by the height-adjustment assembly 10, making the display device 1 suitable for operators of different heights, who can each readily achieve an optimum viewing position for the display panel 19. Furthermore, ability of the display panel 19 to stop at desired positions depends on the overall combination of gravity, the elastic force produced by the spring body 120, and a friction factor between the main shell 110 and the spring body 120. Gravity is constant, and the elastic force produced by the spring body 120 is controllable with the proper material of the spring body 120. Further, the friction factor is also controllable by choosing proper material of the spring body 120 and the main shell 110. That is, the above-described factors determining whether the display panel 19 can stop at the desired positions are controllable, proving the advantages of the display device 1 to be realistically achievable.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A display device comprising:
   a display panel; and
   a height-adjustment assembly comprising:
   a rail unit defining a rail, and comprising a supporting plate fixed to the rail unit and a stopping member located above the supporting plate;
   a sliding unit configured to slide along the rail, the display panel being fixed to the sliding unit, the sliding unit comprising a top arm and two opposite side arms, the top arm interconnecting top portions of the side arms, and a distance between the side arms increasing in a direction away from the top arm; and
   a spring member located between the two side arms and fixed to the rail unit, the spring member being non-slidable relative to the rail unit and configured to provide an elastic force applied to the sliding unit when the sliding unit slides along the rail;
   wherein the supporting plate is configured to support the spring member, the spring member elastically abuts against the side arms, the spring member is configured to provide the elastic force to the sliding unit with various strengths when the sliding unit is located at various locations along the rail, and the stopping member is configured for limiting a range of movement of the sliding unit.

2. The display device of claim 1, wherein the height-adjustment assembly further comprises a supporting base configured to support the display panel, the rail unit, and the spring member, and the rail unit is fixed to the supporting base.

3. The display device of claim 1, further comprising a fixing plate, wherein the fixing plate is slidable together with the sliding unit, the fixing plate defines a groove, and the stopping member has a limited range of movement in the groove.

4. The display device of claim 2, wherein the elastic force is divided into a first component of force and a second component of force, the first component of force is directed away from the supporting base, and the second component of force results in a maximum static friction force in a direction opposite to a direction of tendency of movement of the display panel.

5. The display device of claim 4, wherein the maximum static friction force exceeds the combined first component of force and overall gravity of the sliding unit, the spring member, and the display panel if the display panel tends to move away from the supporting base or move toward the supporting base.

6. The display device of claim 2, wherein the strength of the elastic force decreases when the distance between the sliding unit and the supporting base increases.

7. The display device of claim 1, wherein the spring member comprises a spring body and two rollers, the spring body comprises two side plates and a top plate interconnecting the side plates, the side plates extend obliquely down from opposite sides of the top plate, each side plate comprises a receiving groove defined at a bottom end thereof, the receiving groove defines a substantially semicircular profile, and each receiving groove is configured for partly receiving a corresponding roller, with the roller abutting against a corresponding side arm of the sliding unit.

8. A display device, comprising:
   a display panel; and
   a height-adjustment assembly comprising:
   a supporting base;
   a rail unit defining a rail and being fixed to the supporting base, the rail comprising two opposite walls;
   a sliding unit configured to slide along the rail unit, the display panel being fixed to the sliding unit, wherein the sliding unit comprises a top arm interconnecting top portions of the side arms, and a distance between the side arms increasing in a direction away from the top arm; and
   a spring member comprising a spring body and two rollers, the spring body comprises two side plates and a top plate interconnecting the side plates, the side plates extend obliquely down from opposite sides of the top plate, each side plate comprises a receiving groove defined at a bottom end thereof, the receiving groove defines a substantially semicircular profile, each receiving groove is configured for partly receiving a corresponding roller, and the roller abuts against a corresponding side arm of the sliding unit;
   wherein the sliding unit comprises two side arms, a distance between the two side arms is gradually decreased in a direction away from the supporting base, the spring member is held between the two side arms and non-slidable relative to the rail unit, the spring member elastically abuts the two side arms via the rollers to provide elastic force on the sliding unit so as to press the sliding unit toward the walls of the rail, and the elastic force is gradually increased when the sliding unit moves toward the supporting base.

9. The display device of claim 8, wherein the elastic force is divided into a first component of force and a second component of force, the first component of force is directed away from the supporting base, and the second component of force results in a maximum static friction force in a direction opposite to a direction of tendency of movement of the display panel.

10. The display device of claim 9, wherein the maximum static friction force exceeds the combined first component of force and overall gravity of the sliding unit, the spring member, and the display panel if the display panel tends to move away from the supporting base or move toward the supporting base.

11. The display device of claim 8, wherein the rail unit comprises a supporting plate fixed thereto, and the supporting plate is configured to support the top arm of the spring member.

12. The display device of claim 11, wherein the rail unit further comprises a stopping member located above the supporting plate.

13. The display device of claim 12, further comprising a fixing plate, wherein the fixing plate is slidable together with the sliding unit, the fixing plate defines a groove, and the stopping member has a limited range of movement in the groove.

14. A display device comprising:
   a display panel; and
   a height-adjustment assembly comprising:
   a supporting base;
   a rail unit mounted on the supporting base, the rail unit defining a rail extending along an extending direction from a first side of the rail unit which is adjacent to the supporting base to a second side of the rail unit which is far away from the supporting base, wherein the rail unit comprises a main shell, and the main shell comprises two opposite sliding slots;

a sliding unit attached to the display panel and slidable along the rail, the sliding unit comprising two opposite side arms, each side arm comprising an inner surface and an outer surface, the two inner surfaces of the side arms being opposite to each other and a distance between the inner surfaces being gradually decreased along the extending direction of the rail, and the outer surfaces of the side arms abutting two opposite side walls of the rail; and a spring member fixed to the main shell at a position between the two opposite sliding slots, the spring member received between the two side arms and elastically abutting the inner surfaces of the two side arms, and the spring member configured for providing an elastic force elastically urging the inner surfaces of the side arms toward the side walls of the rail;

wherein, when the display panel is forced to move relative to the supporting base, the sliding unit moves relative to the spring member, and the spring member provides an elastic force with various strengths on the inner surfaces of the side arms when the sliding unit is at various positions along the rail.

15. The display device of claim 14, wherein the inner surfaces of the two side arms are inclined surfaces.

16. The display device of claim 15, wherein the sliding unit further comprises a top arm, the top arm interconnecting top portions of the side arms, and a distance between the side arms increasing in a direction away from the top arm, the spring member comprises a spring body and two rollers, the spring body comprises two side plates and a top plate interconnecting the side plates, the side plates extend obliquely down from opposite sides of the top plate, each side plate comprises a receiving groove defined at a bottom end thereof, the receiving groove defines a substantially semicircular profile, each receiving groove is configured for partly receiving a corresponding roller, and the roller abuts against a corresponding side arm of the sliding unit.

* * * * *